US012743818B2

(12) United States Patent
Tanjim et al.

(10) Patent No.: US 12,743,818 B2
(45) Date of Patent: Sep. 22, 2026

(54) DISCOVERING AND MITIGATING BIASES IN LARGE PRE-TRAINED MULTIMODAL BASED IMAGE EDITING

(71) Applicant: ADOBE INC., San Jose, CA (US)

(72) Inventors: Md Mehrab Tanjim, Santa Clara, CA (US); Krishna Kumar Singh, San Jose, CA (US); Kushal Kafle, Sunnyvale, CA (US); Ritwik Sinha, Cupertino, CA (US)

(73) Assignee: ADOBE INC., San Jose, CA (US)

( * ) Notice: Subject to any disclaimer, the term of this patent is extended or adjusted under 35 U.S.C. 154(b) by 184 days.

(21) Appl. No.: 18/404,295

(22) Filed: Jan. 4, 2024

(65) Prior Publication Data

US 2025/0225683 A1 Jul. 10, 2025

(51) Int. Cl.
*G06T 11/00* (2026.01)
*G06T 9/00* (2006.01)

(52) U.S. Cl.
CPC ................ *G06T 11/00* (2013.01); *G06T 9/00* (2013.01)

(58) Field of Classification Search
CPC .................................. G06T 11/00; G06T 9/00
See application file for complete search history.

(56) References Cited

U.S. PATENT DOCUMENTS 11,205,260 B2 * 12/2021 Li ......................... G06T 7/0004
12,271,978 B1 * 4/2025 Entezari .................. G06F 40/40
2024/0161258 A1 * 5/2024 Maschmeyer ............ G06T 7/70
2024/0161369 A1 * 5/2024 Li ........................... G06T 11/60
2024/0290054 A1 * 8/2024 Yin .......................... G06T 15/04
2024/0320867 A1 * 9/2024 Bean ..................... G06F 16/532
2024/0330381 A1 * 10/2024 Sadr .................... G06F 16/9535
2025/0037323 A1 * 1/2025 Srinivasan .............. G06T 11/00
2025/0037353 A1 * 1/2025 Chu ........................ G06T 17/00
2025/0078392 A1 * 3/2025 Shi ........................ G06T 15/205
2025/0111655 A1 * 4/2025 Povalyaev .............. G06T 11/00
2025/0124301 A1 * 4/2025 Habibian ............. G06N 3/0475
2025/0139160 A1 * 5/2025 Miller .................. H04N 21/251
2025/0259340 A1 * 8/2025 Cheng .................. G06F 40/284

OTHER PUBLICATIONS

Balakrishnan, Guha, et al. "Towards causal benchmarking of biasin face analysis algorithms." Deep Learning-Based Face Analytics. Cham: Springer International Publishing, 2021. 327-359. (Year: 2021).*

(Continued)

*Primary Examiner* — Yu Chen

(74) *Attorney, Agent, or Firm* — F. CHAU & ASSOCIATES, LLC

(57) ABSTRACT

A method, apparatus, non-transitory computer readable medium, apparatus, and system for image processing include obtaining a text prompt and an input image depicting a person, generating a latent code based on the text prompt and the input image, wherein the latent code is optimized by an identity preserving loss, and generating, using an image generator of a machine learning model, a synthetic image based on the latent code, wherein the synthetic image includes an element of the text prompt and preserves an identity of the person in the input image.

20 Claims, 10 Drawing Sheets

(56) References Cited

OTHER PUBLICATIONS

Tanjim, et al., "Generating and Controlling Diversity in Image Search", In Proceedings of the IEEE/CVF Winter Conference on Applications of Computer Vision, (202), (pp. 411-419).
King, "Dlib-ml: A Machine Learning Toolkit", The Journal of Machine Learning Research, 10, 2009, 1755-1758.
Selvaraju, et al., "Grad-CAM: Visual Explanations from Deep Networks via Gradient-based Localization", In Proceedings of the IEEE international conference on computer vision, (2017), (pp. 618-626).
Bolukbasi, et al., "Man is to Computer Programmer as Woman is to Homemaker? Debiasing Word Embeddings", 30th Conference on Neural Information Processing Systems (NIPS 2016), 9 pages.
Karras, et al., "Analyzing and Improving the Image Quality of StyleGAN", In Proceedings of the IEEE/CVF conference on computer vision and pattern recognition, (2020), (pp. 8110-8119).
Kingma, et al., "Auto-Encoding Variational Bayes", arXiv preprint arXiv:1312.6114v11 [stat.ML] Dec. 10, 2022, 14 pages.
Deng, et al., "ArcFace: Additive Angular Margin Loss for Deep Face Recognition", In Proceedings of the IEEE/CVF conference on computer vision and pattern recognition, (2019), (pp. 4690-4699).
Zhang, et al., "The Unreasonable Effectiveness of Deep Features as a Perceptual Metric", In Proceedings of the IEEE conference on computer vision and pattern recognition, (2018), (pp. 586-595).
Radford, et al., "Learning Transferable Visual Models from Natural Language Supervision", arXiv preprint arXiv:2103.00020v1 [cs.CV] Feb. 26, 2021, (pp. 8748-8763), PMLR.
Patashnik, et al., "StyleCLIP: Text-Driven Manipulation of StyleGAN Imagery", In Proceedings of the IEEE/CVF International Conference on Computer Vision, (2021), (pp. 2085-2094).
Brooks, et al., "InstructPix2Pix: Learning to Follow Image Editing Instructions", In Proceedings of the IEEE/CVF Conference on Computer Vision and Pattern Recognition, (2023). (pp. 18392-18402).

* cited by examiner

Figure 2:
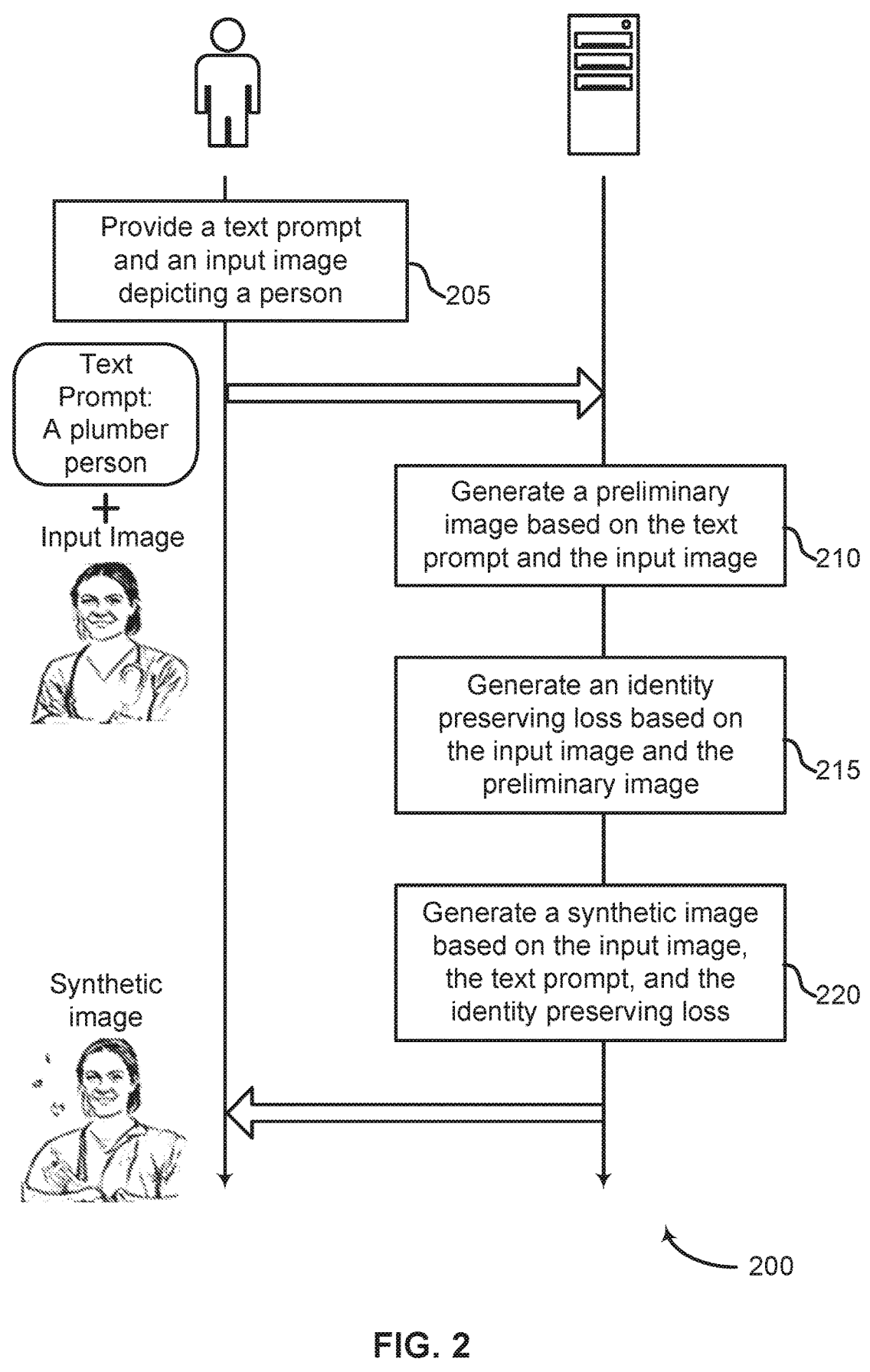

Provide a text prompt and an input image depicting a person
205

Text Prompt: A plumber person
+
Input Image

Generate a preliminary image based on the text prompt and the input image
210

Generate an identity preserving loss based on the input image and the preliminary image
215

Generate a synthetic image based on the input image, the text prompt, and the identity preserving loss
220

Synthetic image

DISCOVERING AND MITIGATING BIASES IN LARGE PRE-TRAINED MULTIMODAL BASED IMAGE EDITING

BACKGROUND

The following relates generally to image processing, and more specifically to image editing using a machine learning model. Image processing refers to the use of a computer to edit an image using an algorithm or a processing network. In some cases, image processing software can be used for various image processing tasks, such as image restoration, image detection, image generation, image compositing, and image editing. For example, image editing includes the use of a machine learning model to edit an input image based on a conditioning to generate an output image.

SUMMARY

Aspects of the present disclosure provide methods, non-transitory computer readable media, apparatuses, and systems for image processing. According to an aspect of the present disclosure, an image generation model generates a preliminary image depicting a person described by a text prompt based on an input image that depicts a person. A machine learning model of the present disclosure includes an attribute classifier that identifies whether a biased depiction of the person exists between the preliminary image and the input image. The machine learning model calculates an identity preserving loss based on the input image and the preliminary image. An optimization component of the machine learning model optimizes a preliminary latent code, which is generated based on the input image and the text prompt, using the identity preserving loss to generate an optimized latent code. An image generator of the machine learning model generates a synthetic image that preserves the identity of the person in the input image based on the optimized latent code.

A method, apparatus, non-transitory computer readable medium, and system for image processing are described. One or more aspects of the method, apparatus, non-transitory computer readable medium, and system include obtaining a text prompt and an input image depicting a person. The one or more aspects further include generating a latent code based on the text prompt and the input image. In one aspect, the latent code is optimized by an identity preserving loss. The one or more aspects further include generating, using an image generator of a machine learning model, a synthetic image based on the latent code. In one aspect, the synthetic image includes an element of the text prompt and preserves an identity of the person in the input image.

An apparatus, system, and method for image processing are described. One or more aspects of the apparatus, system, and method include at least one processor and at least one memory storing instructions executable by the at least one processor. The one or more aspects further include a machine learning model comprising parameters stored in the at least one memory and trained to generate a synthetic image. In one aspect, the machine learning model comprises an image encoder configured to generate a latent code based on a text prompt and an input image depicting a person, an optimization component configured to optimize the latent code based on an identity preserving loss, and an image generator configured to generate the synthetic image including an element of the text prompt and preserving an identity of the person in the input image.

A method, apparatus, non-transitory computer readable medium, and system for image processing are described. One or more aspects of the method, apparatus, non-transitory computer readable medium, and system include generating, using an image generator of a machine learning model, a preliminary image based on a preliminary latent code, wherein the preliminary latent code is based on an input image; optimizing the preliminary latent code based on an identity preserving loss to obtain an optimized latent code, wherein the optimized latent code preserves an identity of a person in an input image; and generating, using the image generator of the machine learning model, a synthetic image based on the optimized latent code.

BRIEF DESCRIPTION OF THE DRAWINGS

FIG. 2 shows an example of a method for preserving the identity of a person in an image according to aspects of the present disclosure.

DETAILED DESCRIPTION

Figure 1:
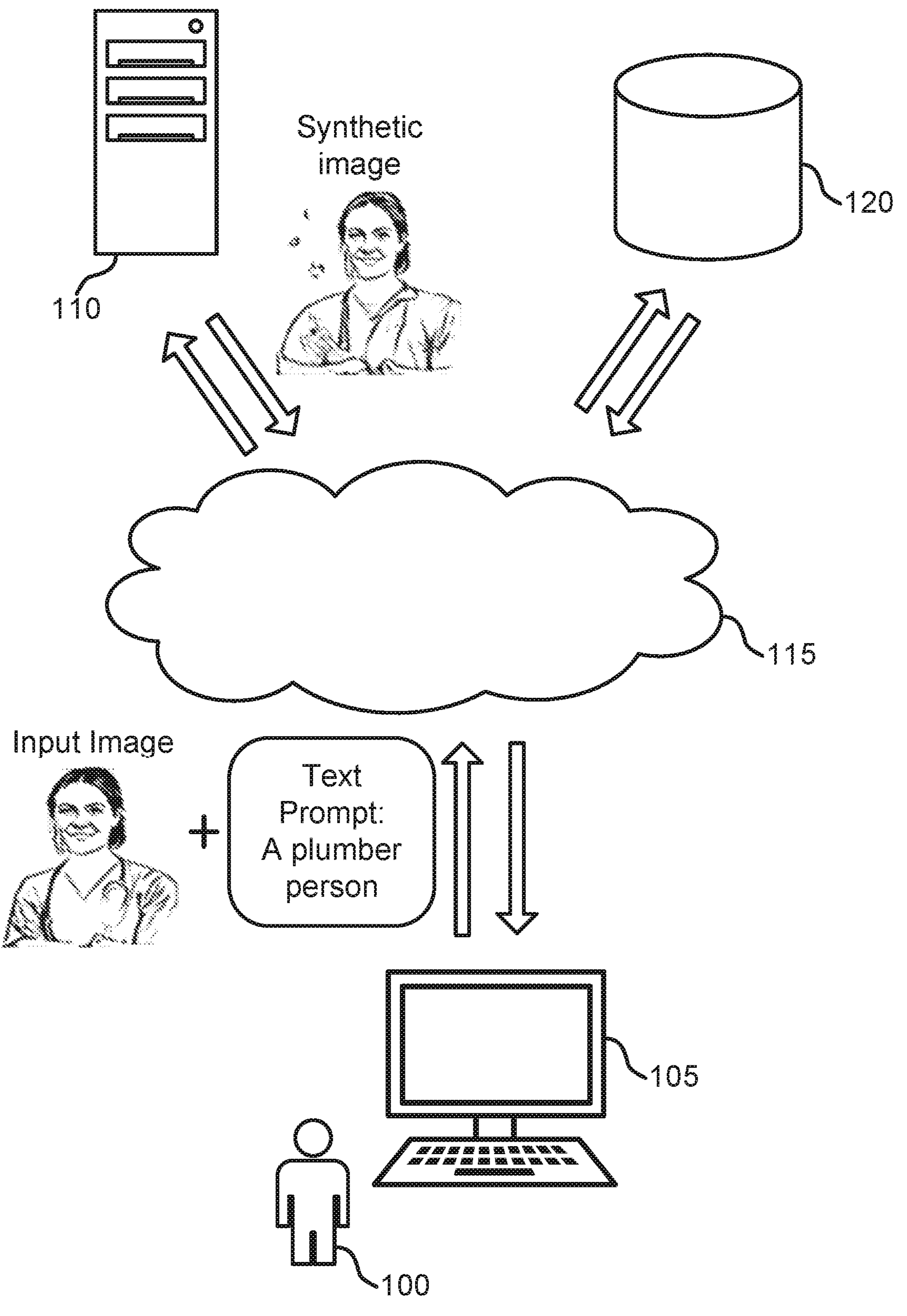
FIG. 1 shows an example of an image processing system according to aspects of the present disclosure.

Aspects of the present disclosure provide methods, non-transitory computer readable media, apparatuses, and systems for image processing. According to an aspect of the present disclosure, an image generation model generates a preliminary image depicting a person described by a text prompt based on an input image that depicts a person. A machine learning model of the present disclosure includes an attribute classifier that identifies whether a biased depiction of the person exists between the preliminary image and the input image. The machine learning model calculates an identity preserving loss based on the input image and the preliminary image. An optimization component of the machine learning model optimizes a preliminary latent code, which is generated based on the input image and the text prompt, using the identity preserving loss to generate an optimized latent code. An image generator of the machine learning model generates a synthetic image that preserves the identity of the person in the input image based on the optimized latent code.

According to some aspects of the present disclosure, the optimization component optimizes latent code generated from the image generation model based on the identity preserving loss. In some embodiments, the optimization component further receives a multi-modal loss to optimize the latent code. In some embodiments, the optimization component further receives a perceptual loss to optimize the latent code. By using the optimized latent code to generate the synthetic image, the identity of the person depicted in the input image is preserved in the synthetic image. For example, the machine learning model avoids making assumptions about the gender or ethnicity of the person depicted in the synthetic image based on the text prompt. In some cases, the synthetic image includes elements described by the text prompt, and biases are reduced.

A subfield in text-to-image generation relates to generating output images based on a text prompt using an image generation model. For example, the image generation model includes a text encoder (e.g., a pre-trained text encoder) that encodes the text prompt to generate a text embedding in latent space. An image generator of the image generation model generates an image based on the text embedding. In some cases, for example, the text prompt may be profession-related, such that the generated image depicts the face of a person and includes one or more elements described by the text prompt. However, images generated using conventional image generation models include unexpected biases in the person's face.

A conventional image generation model is trained on a large set of text-image pairs. In some cases, images generated using the conventional model include various biases. For example, an input image depicting a female face and a text prompt of "Face of a carpenter" is provided to the conventional model. Due to biases in the embedding (e.g., the text embedding of the text prompt), the conventional model associates a male identity with the profession (e.g., carpenter). As a result, the conventional model generates an image depicting a person with, for example, a goatee that represents a male carpenter. In some cases, diffusion-based image generation models demonstrate a similar result.

In conventional image generation models, the text embedding of a text prompt inherently correlates different occupations with different genders or ethnicities. For example, a "nurse" is highly correlated with a "female" and a "doctor" is highly correlated with a male. For example, an "engineer" is highly correlated with a person having a lighter skin tone. As a result, conventional image generation models generate output images having gender bias and/or ethnicity bias based on the text embedding of the input text prompt. In some cases, these output images may have unexpected negative social impacts. In some cases, biased depictions further include age, facial expression, skin tone, or objects.

Accordingly, the present disclosure provides systems and methods that improve on conventional image generation models by generating synthetic images more accurately. For example, by optimizing the latent code of the input image and the text prompt using the identity preserving loss, the machine learning model can generate synthetic images preserving the identity of faces. For example, as shown in at least FIG. 3, the image generation model of the present disclosure accurately generates a synthetic image that preserves the identity of the person depicted in the input image, whereas a conventional image generation model generates an image having a biased depiction of the person (e.g., changed gender of the person).

In one aspect, the machine learning model of the present disclosure can be used to complement existing image generation models (for example, GAN-based or diffusion-based image generation models). In one aspect, by optimizing the latent code generated from the image generation model during inference time, the image generation model can generate synthetic images without extensive training. Accordingly, the computational cost is reduced.

According to some aspects, the optimization component receives additional losses to further optimize the latent code. In some cases, the optimization component receives a multi-modal loss calculated using the preliminary image and the text prompt. For example, the multi-modal loss measures the similarity between the image embedding of the preliminary image and the text embedding of the text prompt in latent space. In some cases, the optimization component receives a perceptual loss calculated using the preliminary image and the input image. For example, the perceptual loss captures the semantic similarity between the preliminary image and the input image.

By optimizing the machine learning model with the identity preserving loss, the multi-modal loss, and/or the perceptual loss, embodiments of the present disclosure can enhance image processing applications or image editing applications such as portrait photography, image filtering, and photo editing by accurately generating synthetic images having an unbiased depiction of a person described by a text prompt. In some cases, for example, the text prompt includes a word or phrase that describes a profession. In one aspect, the machine learning model can accurately generate a synthetic image depicting a person from the input image and preserve the identity (such as gender, ethnicity, or age) of the person in the synthetic image. In one aspect, the synthetic image includes an element described by the text prompt.

Figure 9:
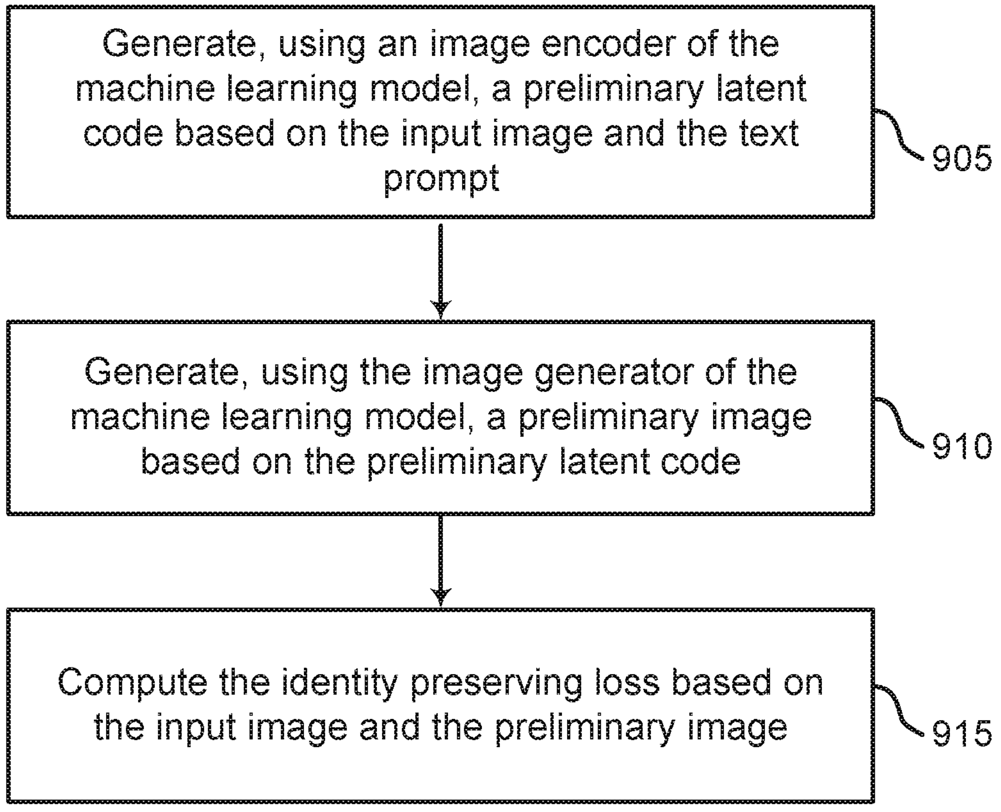
FIG. 9 shows an example of a method for computing identity preserving loss according to aspects of the present disclosure.
Figure 10:
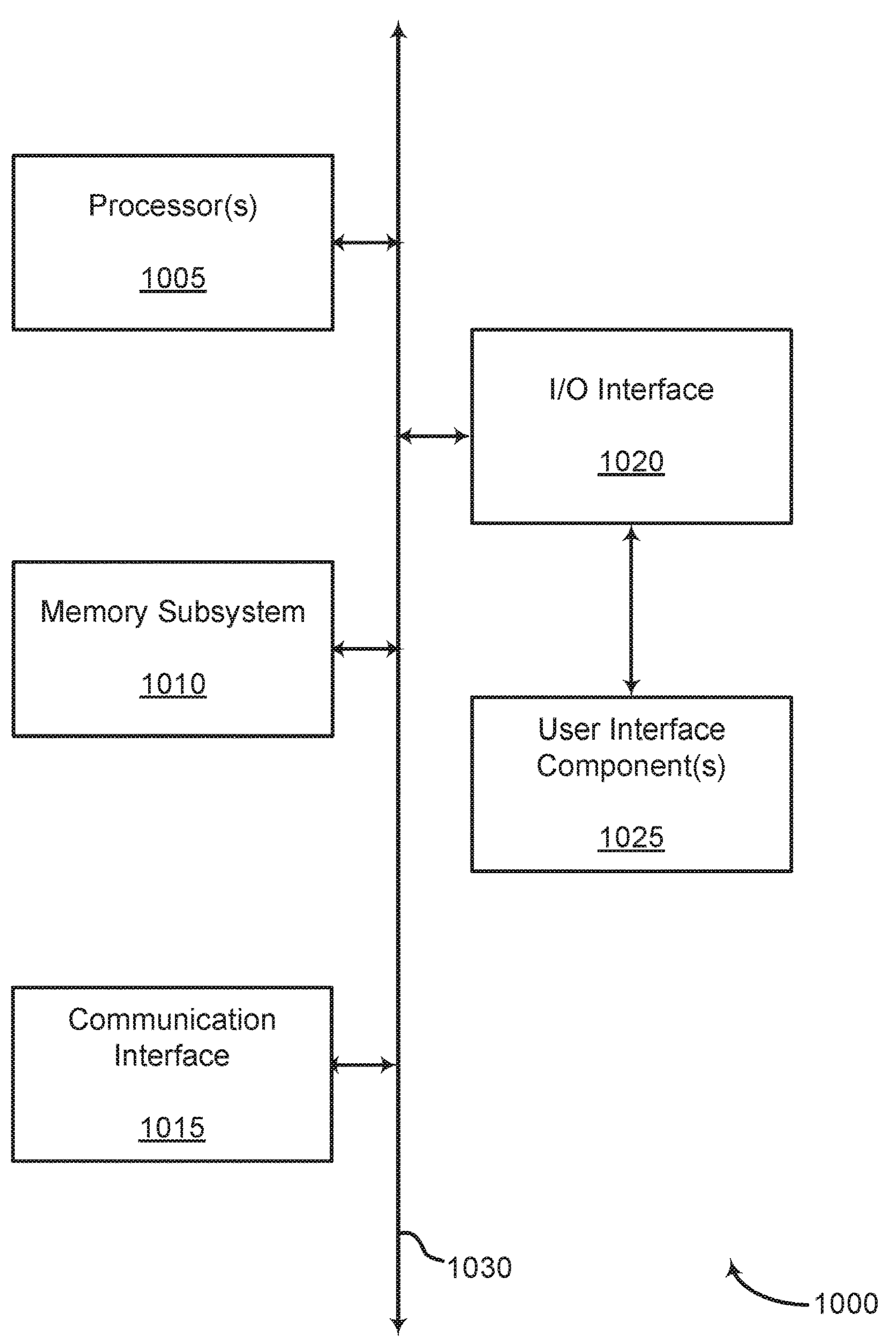
FIG. 10 shows an example of a computing device according to aspects of the present disclosure.

An example system of the inventive concept in image processing is provided with reference to FIGS. 1 and 10. An example application of the inventive concept in image processing is provided with reference to FIGS. 2-3. Details regarding the architecture of an image processing apparatus are provided with reference to FIGS. 5-8. An example of a process for image processing is provided with reference to FIGS. 4 and 9.

Image Processing

In FIGS. 1-4, a method, apparatus, non-transitory computer readable medium, and system for image processing are described. One or more aspects of the method, apparatus, non-transitory computer readable medium, and system include obtaining a text prompt and an input image depicting a person. The one or more aspects further include generating a latent code based on the text prompt and the input image. In one aspect, the latent code is optimized by an identity preserving loss. The one or more aspects further include generating, using an image generator of a machine learning model, a synthetic image based on the latent code. In one aspect, the synthetic image includes an element of the text prompt and preserves an identity of the person in the input image.

Some examples of the method, apparatus, non-transitory computer readable medium, and system further include generating, using an image encoder of the machine learning model, a preliminary latent code based on the input image and the text prompt. Some examples further include generating, using the image generator of the machine learning model, a preliminary image based on the preliminary latent code. Some examples further include computing the identity preserving loss based on the input image and the preliminary image.

Some examples of the method, apparatus, non-transitory computer readable medium, and system further include iteratively generating preliminary images and computing the identity preserving loss to optimize the latent code. Some examples of the method, apparatus, non-transitory computer readable medium, and system further include computing a multi-modal loss based on the preliminary image and the text prompt. In some cases, the latent code is optimized based on the multi-modal loss.

Some examples of the method, apparatus, non-transitory computer readable medium, and system further include computing a perceptual loss based on the preliminary image and the input image. In some cases, the latent code is optimized based on the perceptual loss. Some examples of the method, apparatus, non-transitory computer readable medium, and system further include identifying a biased depiction of the person by calculating an attribute prediction score based on the input image and the preliminary image.

Some examples of the method, apparatus, non-transitory computer readable medium, and system further include encoding, using a text encoder, the text prompt to obtain a text encoding, wherein the latent code is generated based on the text encoding. Some examples of the method, apparatus, non-transitory computer readable medium, and system further include encoding, using an image encoder of the machine learning model, the input image to obtain an image encoding, wherein the latent code is generated based on the image encoding. In some aspects, the synthetic image comprises an unbiased depiction of the person having the element described by the text prompt FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 5.

Referring to FIG. 1, user 100 edits an input image using image processing apparatus 110. For example, user 100 provides a text prompt and an input image to image processing apparatus 110 via user device 105 and cloud 115. In some cases, the input image depicts a woman dressed in a white medical uniform. In some cases, for example, the text prompt states "A plumber person." The text prompt is used as text conditioning to a machine learning model (e.g., the machine learning model described with reference to FIGS. 3, 5, and 6) of image processing apparatus 110.

The machine learning model of image processing apparatus 110 generates a preliminary image based on the input image and the text prompt. In one embodiment, the machine learning model computes an identity preserving loss based on the input image and the preliminary image. The machine learning model optimizes latent codes of the input image and the text prompt using the identity preserving loss. The machine learning model generates an output image (e.g., a synthetic image) based on the optimized latent codes.

In some cases, the synthetic image includes an element described by the text prompt, and the identity of the woman is preserved. For example, compared to the person in the input image, the output image depicts a person with the same gender (e.g., woman), ethnicity, and skin tone. Additionally or alternatively, the output image depicts the person with a different uniform described with the text prompt. For example, the woman in the output image wears a blue plumber uniform. Image processing apparatus 110 displays the synthetic image to user 100 on user device 105, for example, via cloud 115.

As used herein, the term "latent code" refers to embeddings in the latent space. A latent space refers to a lower-dimensional space where features of the original high-dimensional data are preserved. For example, high-dimensional data includes text, images, videos, etc. When converting high-dimensional data into the latent space, a machine learning model is able to efficiently analyze, manipulate, and visualize the data.

The term "embedding" refers to numerical representations of words, sentences, documents, or images in a vector space. The embedding is used to encode semantic meaning, relationships, and context of words, sentences, documents, or images where the encoding can be processed by a machine learning model. Embeddings include text embeddings, image embeddings, style embeddings, color embeddings, etc.

As used herein, the term "element" refers to a feature or variable of the input data. For example, a text prompt states "a plumber person." An element of the text prompt can be a person working as a plumber or other features correlated with a plumber, such as uniform, color, pipe, water supply, sanitation, etc.

As used herein, the term "optimize" or "optimization" refers to the process of adjusting parameters of a machine learning model by minimizing or maximizing certain functions. In some cases, the machine learning model is optimized by loss functions. A loss function measures the difference between the predicted output of the machine learning model and the ground-truth data.

User device 105 may be a personal computer, laptop computer, mainframe computer, palmtop computer, personal assistant, mobile device, or any other suitable processing apparatus. In some examples, user device 105 includes software that incorporates an image editing application. In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-controlled device interfaced with the user interface directly or through an I/O controller module). In some cases, a user interface may be a graphical user interface (GUI). In some examples, a user interface may be represented in code in which the code is sent to the user device 105 and rendered locally by a browser. The process of using the image processing apparatus 110 is further described with reference to FIG. 2.

Image processing apparatus 110 is an example of, or includes aspects of, the corresponding element described with reference to FIG. 5. According to some aspects, image processing apparatus 110 includes a computer implemented network comprising a machine learning model, an image encoder, an image generator, a text encoder, and an optimization component. Image processing apparatus 110 further includes a processor unit, a memory unit, and an I/O module. In some embodiments, image processing apparatus 110 further includes a communication interface, user interface components, and a bus as described with reference to FIG. 10. Additionally, image processing apparatus 110 communicates with user device 105 and database 125 via cloud 115. Further detail regarding the operation of image processing apparatus 110 is provided with reference to FIG. 2.

In some cases, image processing apparatus 110 is implemented on a server. A server provides one or more functions to users linked by way of one or more of the various networks. In some cases, the server includes a single microprocessor board, which includes a microprocessor responsible for controlling aspects of the server. In some cases, a server uses the microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user (e.g., user 100). The term cloud is sometimes used to describe data centers available to many users over the Internet. Some large cloud networks have functions distributed over multiple locations from central servers. A server is designated an edge server if the server has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user (e.g., user 100) interacts with the database controller. In other cases, the database controller may operate automatically without user interaction.

FIG. 2 shows an example of a method 200 for preserving the identity of a person in an image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the system provides a text prompt and an input image depicting a person. In some cases, the operations of this step refer to, or may be performed by, a user as described with reference to FIG. 1. In some cases, the operations of this step refer to, or may be performed by, a machine learning model as described with reference to FIGS. 3, 5, and 6. For example, the text prompt states "A plumber person". For example, the input image depicts a woman in a white medical uniform.

At operation 210, the system generates a preliminary image based on the text prompt and the input image. In some cases, the operations of this step refer to, or may be performed by, a machine learning model as described with reference to FIGS. 3, 5, and 6. In some cases, for example, an image generation model generates the preliminary image based on the text prompt and the input image. For example, the image generation model may be a GAN-based image generation model or a diffusion-based image generation model. In some cases, the preliminary image includes a biased depiction of the person from the input image. For example, due to the inherent semantics of the text prompt, the text embedding of the text prompt may associate a plumber with a male. As a result, the person depicted in the preliminary image may have a different gender compared to the gender of the person in the input image.

At operation 215, the system generates an identity preserving loss based on the input image and the preliminary image. In some cases, the operations of this step refer to, or may be performed by, a machine learning model as described with reference to FIGS. 3, 5, and 6. In one aspect, an optimization component (e.g., described with reference to FIGS. 5 and 6) calculates the cosine similarity between the identity feature of the input image and the identity feature of the preliminary image. Details on the identity preserving loss are described with reference to FIGS. 6 and 9.

At operation 220, the system generates a synthetic image based on the input image, the text prompt, and the identity preserving loss. In some cases, the operations of this step refer to, or may be performed by, a machine learning model as described with reference to FIGS. 3, 5, and 6. In some cases, the operations of this step refer to, or may be performed by, an image generator as described with reference to FIGS. 5 and 6. In one aspect, the machine learning model generates latent code based on the input image and the text prompt. For example, the latent code includes an image embedding of the input image and a text embedding of the text prompt, where the latent code is represented in a latent space. The machine learning model generates the synthetic image based on the latent code, where the latent code is optimized using the identity preserving loss. Details on optimizing the latent code are described with reference to FIG. 6.

In some cases, the synthetic image includes an element of the text prompt and preserves the identity of the person in the input image. For example, the synthetic image depicts a woman wearing a blue plumber uniform. The identity of the person (i.e., the woman) is preserved in the synthetic image. Additionally, an element (e.g., the blue plumber uniform) of the text prompt is included in the synthetic image.

Figure 3:
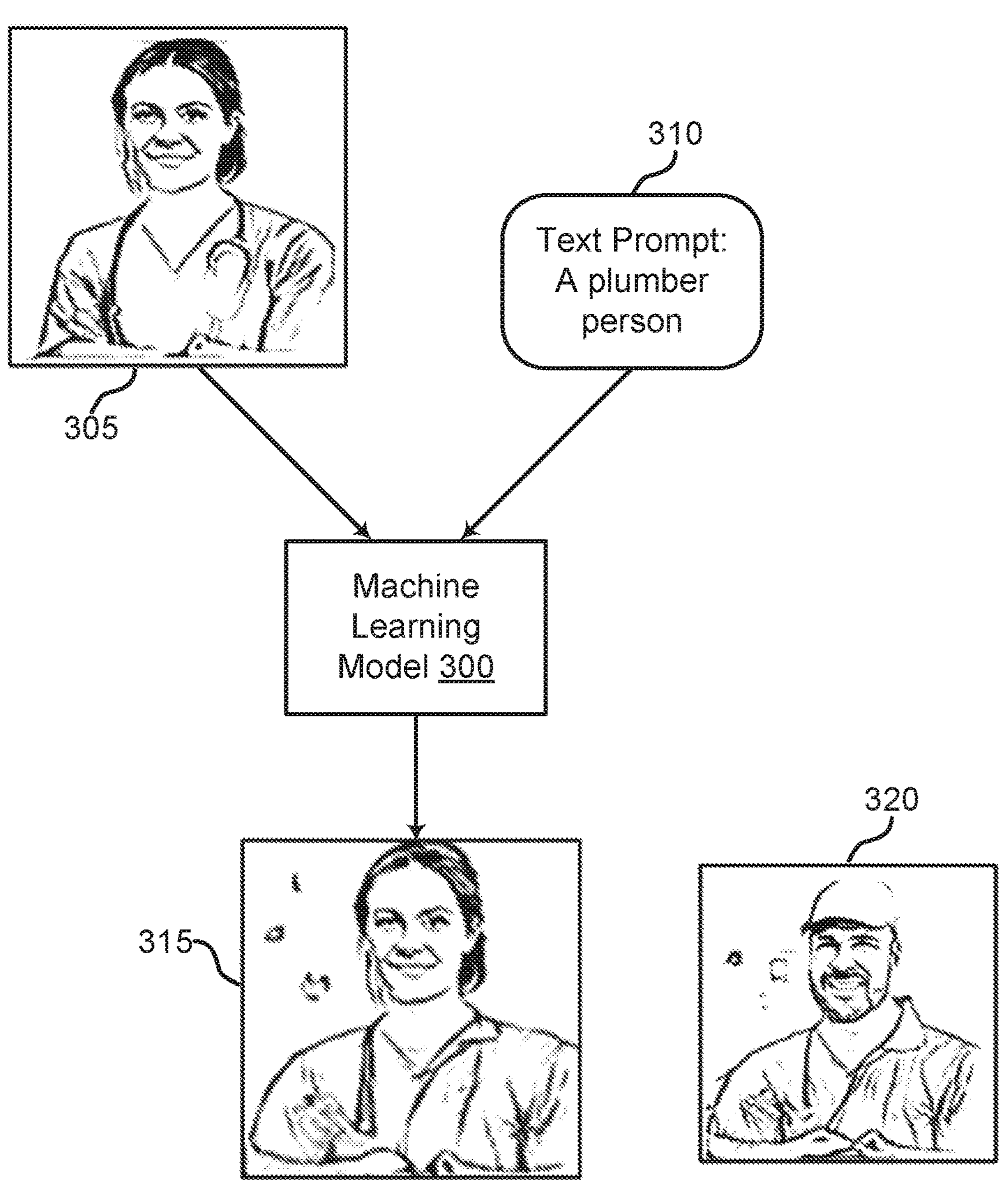
FIG. 3 shows an example of image editing according to aspects of the present disclosure.

FIG. 3 shows an example of image editing according to aspects of the present disclosure. The example shown includes machine learning model 300, input image 305, text prompt 310, synthetic image 315, and conventional output image 320.

Referring to FIG. 3, machine learning model 300 receives input image 305 and text prompt 310 and generates synthetic image 315. In some cases, input image 305 depicts a woman dressed in a white medical uniform. In some cases, text prompt 310 states "A plumber person." Machine learning model 300 generates synthetic image 315 depicting a woman dressed in a blue plumber uniform.

Conventional image generation models are unable to generate an image that includes an unbiased depiction of the person in input image 305. For example, many image generation models use a pre-trained text encoder that contains information for text-image pairs. In some cases, a text embedding of a text description contains inherent semantics of the text description. For example, a text embedding of text prompt 310 may include semantic information such as plumber, blue uniform, wrench, water, male, etc. As a result, a conventional image generation model that uses text embedding as guidance to generate an output image may include one or more of these elements. For example, conventional output image 320 depicts a man dressed in a blue plumber uniform. Although the conventional image generation model generates an output image having an element described by text prompt 310, the output image still includes an unwanted biased depiction of the person in the input image 305.

Conventional image generation models are trained on a diverse set of image and text pairs to learn a joint embedding space that can map image embeddings and text embeddings in the joint embedding space. For example, Contrastive Language-Image Pre-training (CLIP) model is a neural network model that is trained on a diverse set of image and text pairs. In some cases, the conventional image generation model includes at least two components, a text encoder and an image encoder. The image encoder is a convolutional neural network that takes an image as input and outputs a feature vector. The text encoder is a transformer-based language model that takes a text description as input and outputs a feature vector. The two feature vectors are then projected into a shared embedding space using a linear projection layer. In some cases, the shared embedding space is a latent space. In some cases, the CLIP uses a contrastive learning approach as the training objective.

StyleCLIP is a text-to-image generative model that uses a combination of CLIP and StyleGAN2. StyleCLIP uses the pre-trained text embedding from CLIP and generates editing directions that are not predetermined, thus, generating more flexible and imaginative image transformations. In some cases, given an input image, corresponding latent codes or style vectors can be represented as $s \in S$ in the generative model G, where S is the style space of StyleGAN2. In some cases, the changes in the latent space $\Delta s$ according to changes in the prompt texts $\Delta t$ are computed so that the new modified image matches the target text description.

For example, StyleCLIP first learns the relevancy between different channels c in the style space S and a given direction $\Delta i$ in CLIP's image embedding space. For example, for a given style vector s, the model generates an image pair: $G(s \pm \alpha \Delta s_c)$, where $\Delta s_c$ is a zero vector, except for the c coordinate. The corresponding changes in the CLIP image embedding are calculated as $\Delta i_c$. This process is repeated to generate a fixed number of image pairs (e.g., one hundred image pairs) for each channel c. In some cases, CLIP space direction between the resulting pair of images, the relevance of channel c to the target editing is computed as the mean projection of $\Delta i_c$ onto $\Delta i$:

$$R_c(\Delta i) = \frac{1}{|S|} \sum_{s \in S} \Delta i_c \cdot \Delta i.$$

In some cases, the domain of the generated images is dependent on the type of dataset on which StyleGAN2 is trained. For example, if StyleGAN2 is trained on faces, then all the generated images also include faces.

InstructPix2Pix is a conventional diffusion-based image generation model that is able to edits images from any domain. For example, InstructPix2Pix uses a finetuned language model to generate instructional content and edited captions based on the text input. Then, InstructPix2Pix generates pairs of images corresponding to the pairs of captions. Then the model is trained based on the dataset. For example, given an input image x and using pretrained image encoder E, the diffusion process adds noise to the encoded latent $z=E(x)$ generating a noisy latent $z_t$, where the noise level increases over timesteps $t \in T$. Then, using the generated dataset to obtain the image conditioning $c_I$ and text instruction conditioning $c_T$, the model trains a network $\theta$ that predicts the noise added to the noisy latent $z_t$ by minimizing the following latent diffusion objective:

$$L = E_{x, c_I, c_T, \epsilon \sim N(0,1)} \| z_t - \theta(z_t, t, E(c_I), c_T) \|_2^2.$$

Accordingly, InstructPix2Pix is able to edit images based on the text instructions. During inference, InstructPix2Pix uses a classifier-free guidance, a null token $\emptyset$, and guidance scale (e.g., $s_I$ for image conditioning, and $s_T$ for text conditioning) to generation the edited image. For example: $\tilde{\theta}(z_t, c_I, c_T) = \theta(z_T, \emptyset, \emptyset) + s_I \cdot (\theta(z_T, c_I, \emptyset) - \theta(z_T, \emptyset, \emptyset)) + s_T \cdot (\theta(z_T, c_I, c_T) - \theta(z_T, c_I, \emptyset))$.

However, the conventional image generation model, whether CLIP, StyleCLIP, or InstructPix2Pix, fails to generate an image having an unbiased depiction of the person in the original input image. Due to the use of a pretrained text encoder, the image generation model generates images having biased features based on the semantic information of the text embeddings. Accordingly, by optimizing latent codes of the input image and the text prompt, the machine learning model of the present disclosure can generate a synthetic image (e.g., synthetic image 315) that includes elements described by the text prompt 310 and preserves the identity of the person in the input image 305.

In some cases, machine learning model 300 identifies an additional biased depiction of the person in input image 305. For example, additional biases can be certain attributes such as a smile may be associated with kindness or success, eyeglasses may be associated with intelligence, and an absence of eyeglasses may be associated with power. Accordingly, machine learning model 300 generates synthetic image 315, where the additional biased depiction of the person is removed.

Machine learning model 300 is an example of, or includes aspects of, the corresponding element described with reference to FIGS. 5 and 6. Input image 305 is an example of, or includes aspects of, the corresponding element described with reference to FIG. 6. Text prompt 310 is an example of, or includes aspects of, the corresponding element described with reference to FIGS. 6 and 8. Synthetic image 315 is an example of, or includes aspects of, the corresponding element described with reference to FIG. 6.

Figure 4:
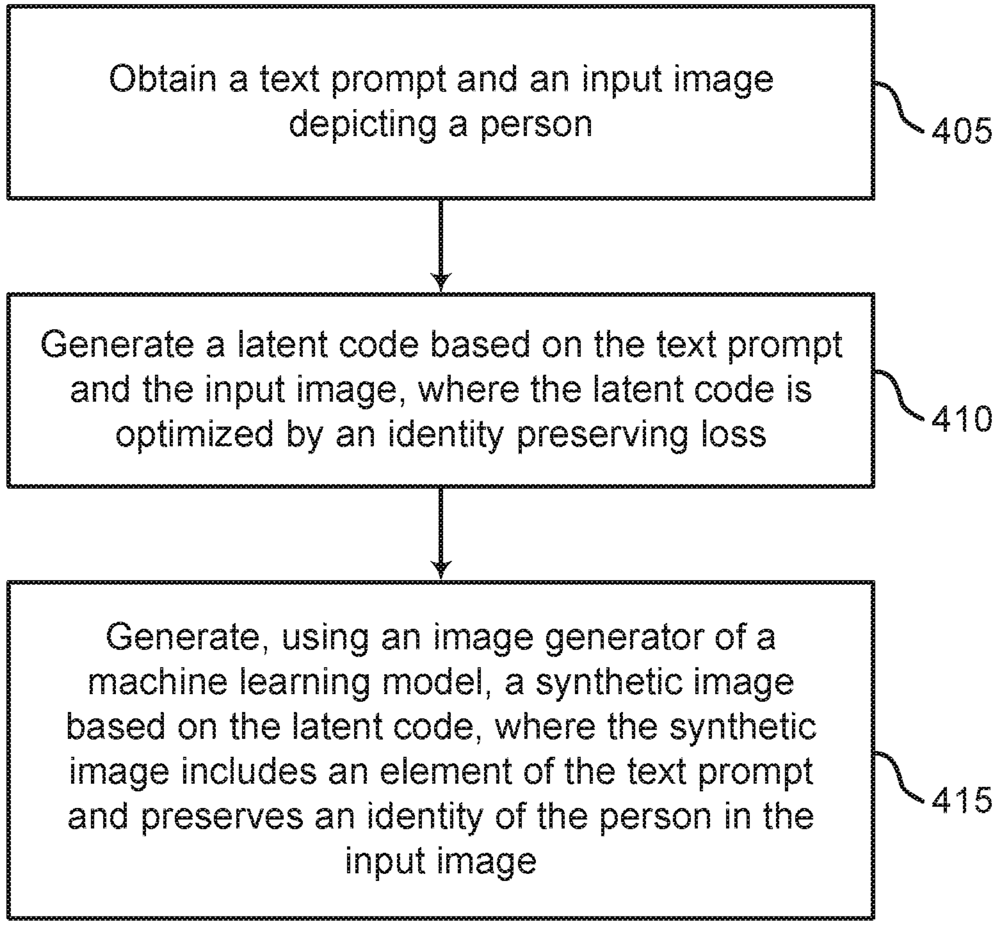
FIG. 4 shows an example of a method for mitigating biases in image editing according to aspects of the present disclosure.

FIG. 4 shows an example of a method 400 for mitigating biases in image editing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system obtains a text prompt and an input image depicting a person. In some cases, the operations of this step refer to, or may be performed by, a machine learning model as described with reference to FIGS. 3, 5, and 6. For example, the text prompt states "A plumber person". For example, the input image depicts a woman in a white medical uniform.

At operation 410, the system generates a latent code based on the text prompt and the input image, where the latent code is optimized by an identity preserving loss. In some cases, the operations of this step refer to, or may be performed by, an optimization component as described with reference to FIGS. 5 and 6. In some cases, the image generation model generates a text embedding based on the text prompt and an image embedding based on the input image. A preliminary latent code includes the text embedding and the image embedding, for example, in the latent space. An optimization component of the machine learning model receives the preliminary latent code, optimizes the preliminary latent code based on the identity preserving loss, and generates the latent code based on the optimized preliminary latent code. Details on the optimization component, the preliminary latent code, and the latent code are described with reference to FIG. 6.

At operation 415, the system generates, using an image generator of a machine learning model, a synthetic image based on the latent code, where the synthetic image includes an element of the text prompt and preserves an identity of the person in the input image. In some cases, the operations of this step refer to, or may be performed by, an image generator as described with reference to FIG. 5. For example, the machine learning model generates the synthetic image depicting the same person in the input image, and having additional features described by the text prompt. For example, the synthetic image includes the same woman depicted in the input image but dressed in an outfit (e.g., blue plumber uniform) described by the text prompt. Details on the synthetic image is described with reference to FIG. 3.

According to some embodiments, a text-based optimization is used to generate the synthetic image. In some cases, the machine learning model removes features of gender or ethnicity from the text embeddings by identifying and removing gender subspaces. For example, the machine learning model performs principal component analysis on commonly used male and female words. Then, the principal components of these words are used as the gender subspace to project text embeddings and the orthogonal direction is taken to remove the gender component. For example, given a text embedding t for the text prompt, the machine learning model projects the text embedding onto the gender space G and subtracts the projection from the original embedding to obtain a debiased embedding t'. For example, debiased embedding can be represented as $$t' = t - \sum_{k=1}^{K} g_i * (t \cdot g_i)/\|g_i\|_2,$$

where $g_1, g_2 \ldots g_K$ are the principal components in the gender subspace G. Then, debiased embedding is normalized as $$t' = \frac{t'}{\|t'\|_2}$$

to find the desired direction.

System Architecture

In FIGS. 5-8, an apparatus, system, and method for image processing are described. One or more aspects of the apparatus, system, and method include at least one processor and at least one memory storing instructions executable by the at least one processor. The one or more aspects further include a machine learning model comprising parameters stored in the at least one memory and trained to generate a synthetic image. In one aspect, the machine learning model comprises an image encoder configured to generate a latent code based on a text prompt and an input image depicting a person, an optimization component configured to optimize the latent code based on an identity preserving loss, and an image generator configured to generate the synthetic image including an element of the text prompt and preserving an identity of the person in the input image.

In some aspects, the machine learning model comprises a text encoder configured to encode the text prompt. In some aspects, the machine learning model comprises a generative adversarial network (GAN). In some aspects, the machine learning model comprises a variational autoencoder (VAE). In some aspects, the machine learning model comprises a diffusion model.

Figure 5:
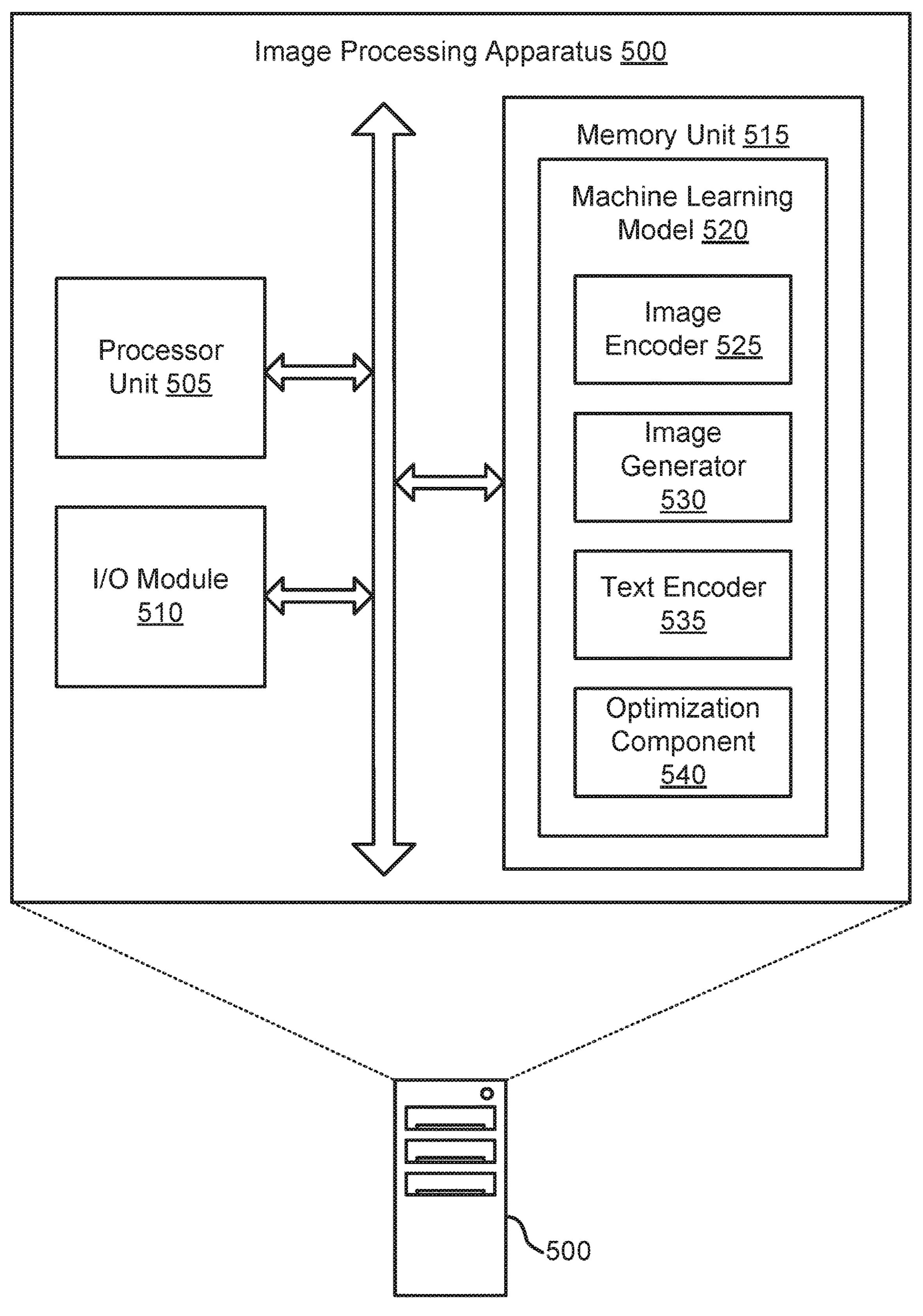
FIG. 5 shows an example of an image processing apparatus according to aspects of the present disclosure.

FIG. 5 shows an example of an image processing apparatus 500 according to aspects of the present disclosure. The example shown includes image processing apparatus 500, processor unit 505, I/O module 510, and memory unit 515. In one aspect, memory unit 515 includes machine learning model 520, image encoder 525, image generator 530, text encoder 535, and optimization component 540. In one aspect, machine learning model 520 includes image encoder 525, image generator 530, text encoder 535, and optimization component 540. Image processing apparatus 500 is an example of, or includes aspects of, the corresponding element described with reference to FIG. 1.

According to some embodiments of the present disclosure, image processing apparatus 500 includes a computer-implemented artificial neural network (ANN). An ANN is a hardware or a software component that includes a number of connected nodes (e.g., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. In some examples, nodes may determine the output using other mathematical algorithms (e.g., selecting the max from the inputs as the output) or any other suitable algorithm for activating the node. Each node and edge is associated with one or more node weights that determine how the signal is processed and transmitted.

During the training process, the one or more node weights are adjusted to increase the accuracy of the result (e.g., by minimizing a loss function that corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on the corresponding inputs. The initial layer is known as the input layer and the last layer is known as the output layer. In some cases, signals traverse certain layers multiple times.

According to some embodiments, image processing apparatus 500 includes a computer-implemented convolutional neural network (CNN). CNN is a class of neural networks commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (e.g., the receptive field). During a forward pass of the CNN, filters at each layer may be convolved across the input volume, computing the dot product between the filter and the input. During the training process, the filters may be modified so that the filters activate when the filters detect a particular feature within the input.

Processor unit 505 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 505 is configured to operate a memory array using a memory controller. In other cases, a memory controller is integrated into the processor. In some cases, processor unit 505 is configured to execute computer-readable instructions stored in a memory to perform various functions. In some embodiments, processor unit 505 includes special-purpose components for modem processing, baseband processing, digital signal processing, or transmission processing. Processor unit 505 is an example of, or includes aspects of, the processor described with reference to FIG. 10.

I/O module 510 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 510 includes a user interface. A user interface may enable a user to interact with a device. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a communication interface operates at the boundary between communicating entities and the channel and may also record and process communications. A communication interface is provided herein to enable a processing system coupled to a transceiver (e.g., a transmitter and/or a receiver). In some examples, the transceiver is configured to transmit (or send) and receive signals for a communications device via an antenna.

Examples of memory unit 515 include random access memory (RAM), read-only memory (ROM), or a hard disk. Examples of memory unit 515 include solid-state memory and a hard disk drive. In some examples, memory unit 515 is used to store computer-readable, computer-executable software including instructions that, when executed, cause a processor to perform various functions described herein. In some cases, memory unit 515 contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within memory unit 515 store information in the form of a logical state. Memory unit 515 is an example of, or includes aspects of, the memory subsystem described with reference to FIG. 10.

In one aspect, memory unit 515 includes instructions executable by processor unit 505. In one aspect, memory unit 515 includes machine learning model 520 or stores parameters of machine learning model 520. In one aspect, memory unit 515 includes machine learning model 520, image encoder 525, image generator 530, text encoder 535, and optimization component 540.

According to some aspects, machine learning model 520 obtains a text prompt and an input image depicting a person. In some examples, machine learning model 520 iteratively generates preliminary images and computes the identity preserving loss to optimize the latent code. In some aspects, the synthetic image includes an unbiased depiction of the person having the element described by the text prompt.

According to some aspects, machine learning model 520 comprises parameters stored in the at least one memory and trained to generate a synthetic image. In one aspect, the machine learning model 520 comprises an image encoder 525 configured to generate a latent code based on a text prompt and an input image depicting a person, an optimization component 540 configured to optimize the latent code based on an identity preserving loss, and an image generator 530 configured to generate the synthetic image including an element of the text prompt and preserving an identity of the person in the input image. In some aspects, machine learning model 520 includes a text encoder 535 configured to encode the text prompt.

In some aspects, machine learning model 520 includes a generative adversarial network (GAN). In some aspects, machine learning model 520 includes a variational autoencoder (VAE). In some aspects, machine learning model 520 includes a diffusion model. According to some aspects, machine learning model 520 iteratively generates preliminary images and computing the identity preserving loss to update the optimized latent code. Machine learning model 520 is an example of, or includes aspects of, the corresponding element described with reference to FIGS. 3 and 6.

According to some aspects, image encoder 525 of the machine learning model 520 generates a preliminary latent code based on the input image and the text prompt. In some examples, image encoder 525 of the machine learning model 520 encodes the input image to obtain an image encoding, where the latent code is generated based on the image encoding.

According to some aspects, image encoder 525 of machine learning model 520 generates a preliminary latent code based on a text prompt and an input image depicting a person. In some examples, image encoder 525 of the machine learning model 520 encodes the input image to obtain an image encoding, where the optimized latent code is generated based on the image encoding. Image encoder 525 is an example of, or includes aspects of, the corresponding element described with reference to FIGS. 6 and 8.

According to some aspects, image generator 530 of machine learning model 520 generates a synthetic image based on the latent code. In some cases, the synthetic image includes an element of the text prompt and preserves an identity of the person in the input image. In some examples, image generator 530 of machine learning model 520 generates a preliminary image based on the preliminary latent code.

According to some aspects, image generator 530 of machine learning model 520 generates a preliminary image based on the preliminary latent code. In some examples, image generator 530 of machine learning model 520 generates a synthetic image based on the optimized latent code. Image generator 530 is an example of, or includes aspects of, the first image generator or the second image generator described with reference to FIG. 6.

According to some aspects, text encoder 535 encodes the text prompt to obtain a text encoding. In some cases, the latent code is generated based on the text encoding. Text encoder 535 is an example of, or includes aspects of, the corresponding element described with reference to FIG. 8. Text encoder 535 is an example of, or includes aspects of, the first text encoder or the second text encoder described with reference to FIG. 6.

According to some aspects, optimization component 540 generates a latent code based on the text prompt and the input image. In some cases, the latent code is optimized by an identity preserving loss. In some examples, optimization component 540 computes the identity preserving loss based on the input image and the preliminary image. In some examples, optimization component 540 computes a multi-modal loss based on the preliminary image and the text prompt. In some cases, the latent code is optimized based on the multi-modal loss. In some examples, optimization component 540 computes a perceptual loss based on the preliminary image and the input image. In some cases, the latent code is optimized based on the perceptual loss.

According to some aspects, optimization component 540 computes an identity preserving loss based on the input image and the preliminary image. In some examples, optimization component 540 optimizes the preliminary latent code based on the identity preserving loss to obtain an optimized latent code. In some cases, the optimized latent code preserves an identity of the person in the input image. In some examples, optimization component 540 computes a multi-modal loss based on the preliminary image and the text prompt. In some cases, the optimized latent code is optimized based on the multi-modal loss. In some examples, optimization component 540 computes a perceptual loss based on the preliminary image and the input image. In some cases, the optimized latent code is optimized based on the perceptual loss. Optimization component 540 is an example of, or includes aspects of, the corresponding element described with reference to FIG. 6.

Figure 6:
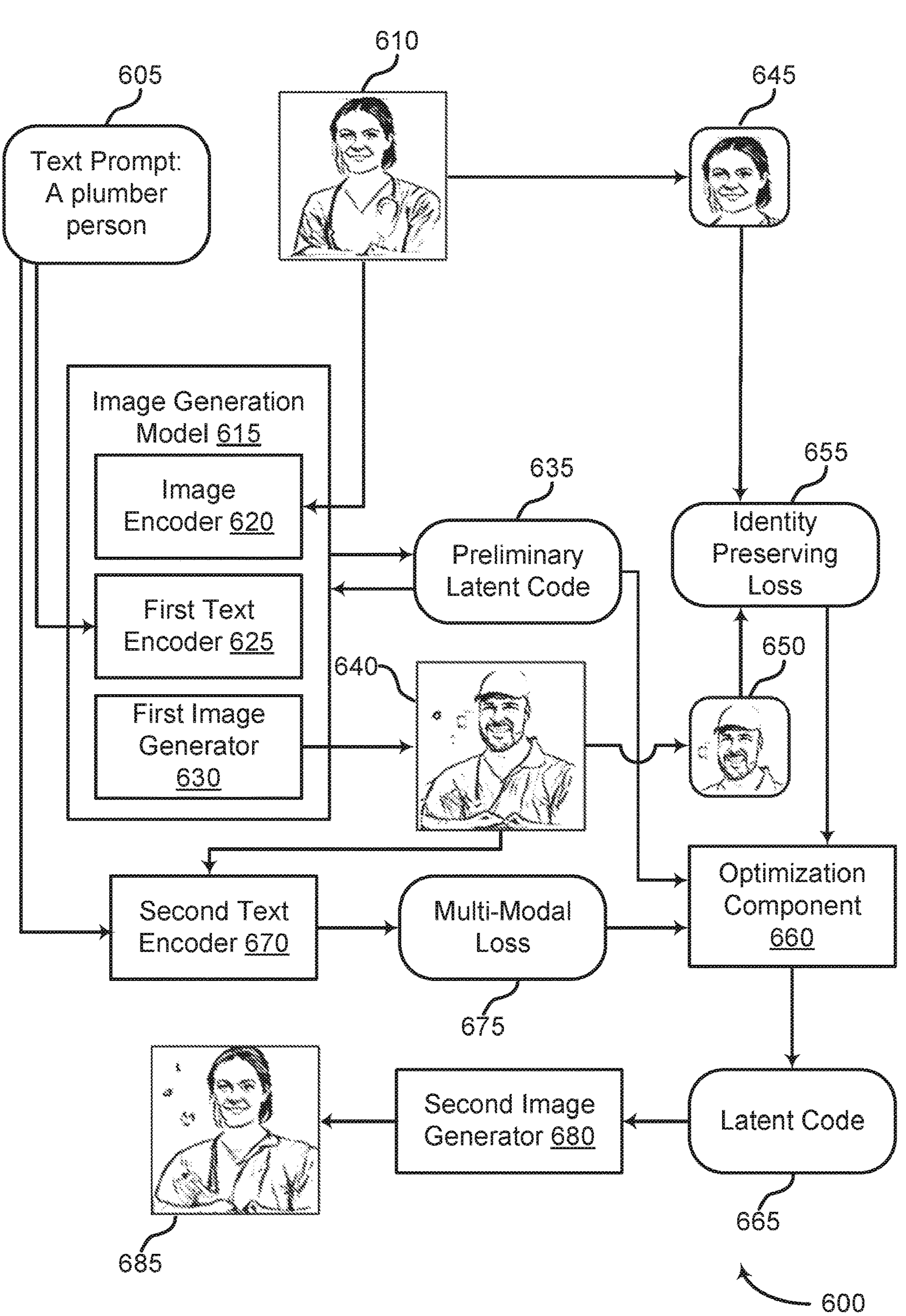
FIG. 6 shows an example of a machine learning model according to aspects of the present disclosure.

FIG. 6 shows an example of a machine learning model 600 according to aspects of the present disclosure. The example shown includes machine learning model 600, text prompt 605, input image 610, image generation model 615, preliminary latent code 635, preliminary image 640, input image identity 645, preliminary image identity 650, identity preserving loss 655, optimization component 660, latent code 665, second text encoder 670, multi-modal loss 675, second image generator 680, and synthetic image 685. In one aspect, image generation model 615 includes image encoder 620, first text encoder 625, and first image generator 630.

Referring to FIG. 6, text prompt 605 is provided to first text encoder 625 of image generation model 615. For example, text prompt 605 states “A plumber person.” First text encoder 625 generates a text embedding based on text prompt 605. In some cases, for example, the text embedding includes elements such as plumber, blue plumber uniform, pipe, water supply, sanitation, wrench, etc. In some cases, the text embedding is generated in a latent space. input image 610 is provided to image encoder 620 of image generation model 615. For example, input image 610 depicts a woman dressed in a white medical uniform. Image encoder 620 generates an image embedding based on input image 610. In some cases, the image embedding is generated in latent space. In one embodiment, image generation model 615 generates preliminary latent code 635 based on text prompt 605 and input image 610. In some cases, for example, preliminary latent code 635 includes the text embedding and the image embedding.

In one aspect, image generation model 615 is a GAN-based image generation model. In one aspect, image generation model 615 is a diffusion-based image generation model. In one aspect, image generation model 615 includes a variational autoencoder (VAE).

An autoencoder is a type of ANN used to learn efficient data encoding in an unsupervised manner. The aim of an autoencoder is to learn a representation (encoding) for a set of data, e.g., for dimensionality reduction, by training the network to ignore signal “noise”. Along with the reduction side, a reconstructing side may also be learned. The reconstructing network tries to generate, from the reduced encoding, a representation as close as possible to the original input. Several variants exist to the basic model, with the aim of forcing the learned representations of the input to assume useful properties. Examples include regularized autoencoders (Sparse, Denoising and Contractive autoencoders), which can be effective in learning representations for subsequent classification tasks, and Variational autoencoders (VAEs), which may be useful as generative models. In some cases, VAEs operate by making assumptions concerning the distribution of latent variables. The variational approach for latent representation learning may result in an additional loss component and a specific estimator for the training algorithm called the Stochastic Gradient Variational Bayes (SGVB) estimator.

According to some embodiments, first image generator 630 of image generation model 615 generates preliminary image 640 based on preliminary latent code. In some cases, preliminary image 640 includes elements described by text prompt 605. However, in some cases, preliminary image 640 includes a biased depiction of the person in input image 610. For example, preliminary image 640 depicts a man wearing a blue plumber uniform, instead of the woman depicted in input image 610. As a result, preliminary image 640 includes an undesired bias that changed the identity of the woman in input image 610 based on the description of text prompt 605.

In some embodiments, a pretrained attribute classifier computes an attribute prediction score based on input image 610 and preliminary image 640 to identify the biased depiction of the person. For example, the average RMSE (root mean squared error) of the attribution score is computed as:

$$RMSE = \sqrt{\sum_{i=1}^{d} (A_p(i_g)_i - A_p(i_o)_i)^2}.$$

In one aspect, a lower score represents the generated images are similar to the original image in terms of protected attributes.

According to some embodiments, machine learning model 600 extracts identity features from input image 610 and preliminary image 640. For example, a pretrained face recognition network is used to extract input image identity 645 from input image 610 and preliminary image identity 650 from preliminary image 640. Input image identity 645 and preliminary image identity 650 are used to compute identity preserving loss 655. In some embodiments, image generation model 615 iteratively generates preliminary images and computes identity preserving loss 655 to optimize latent code 665. Details on the pretrained face recognition network (e.g., ArcFace) are described with reference to FIG. 9. Details on computing identity preserving loss are described with reference to FIG. 9.

According to some embodiments, optimization component 660 receives preliminary latent code 635 and identity preserving loss 655 and generates latent code 665 (also referred to as optimized latent code). In some embodiments, optimization component 660 receives multi-modal loss 675 to generate latent code 665. For example, second text encoder 670 encodes text prompt 605 to generate a text embedding and encodes preliminary image 640 to generate an image embedding. The text embedding of text prompt 605 and the image embedding of preliminary image 640 are used to compute multi-modal loss 675. In one embodiment, second text encoder 670 and first text encoder 625 are the same text encoders. Details on multi-modal loss 675 are described with reference to FIG. 9.

According to some embodiments, optimization component 660 receives a perceptual loss to optimize preliminary latent code 635 to generate latent code 665. For example, the perceptual loss measures the semantic similarity between input image 610 and preliminary image 640. Details on perceptual loss are described with reference to FIG. 9. According to some embodiments, optimization component 660 optimizes preliminary latent code 635 to generate latent code 665 based on at least one of identity preserving loss 655, multi-modal loss 675, and perceptual loss.

In some embodiments, second image generator 680 receives the optimized latent code (or latent code 665) and generates synthetic image 685. Compared to preliminary image 640, synthetic image 685 includes an unbiased depiction of the woman from input image 610 and an element (e.g., blue plumber uniform) described by text prompt 605. In one embodiment, second image generator 680 and first image generator 630 are the same image generator.

Machine learning model 600 is an example of, or includes aspects of, the corresponding element described with reference to FIGS. 3 and 5. Text prompt 605 is an example of, or includes aspects of, the corresponding element described with reference to FIGS. 3 and 8. Input image 610 is an example of, or includes aspects of, the corresponding element described with reference to FIG. 3.

Image encoder 620 is an example of, or includes aspects of, the corresponding element described with reference to FIGS. 5 and 8. Optimization component 660 is an example of, or includes aspects of, the corresponding element described with reference to FIG. 5. Synthetic image 682 is an example of, or includes aspects of, the corresponding element described with reference to FIG. 3.

Figure 7:
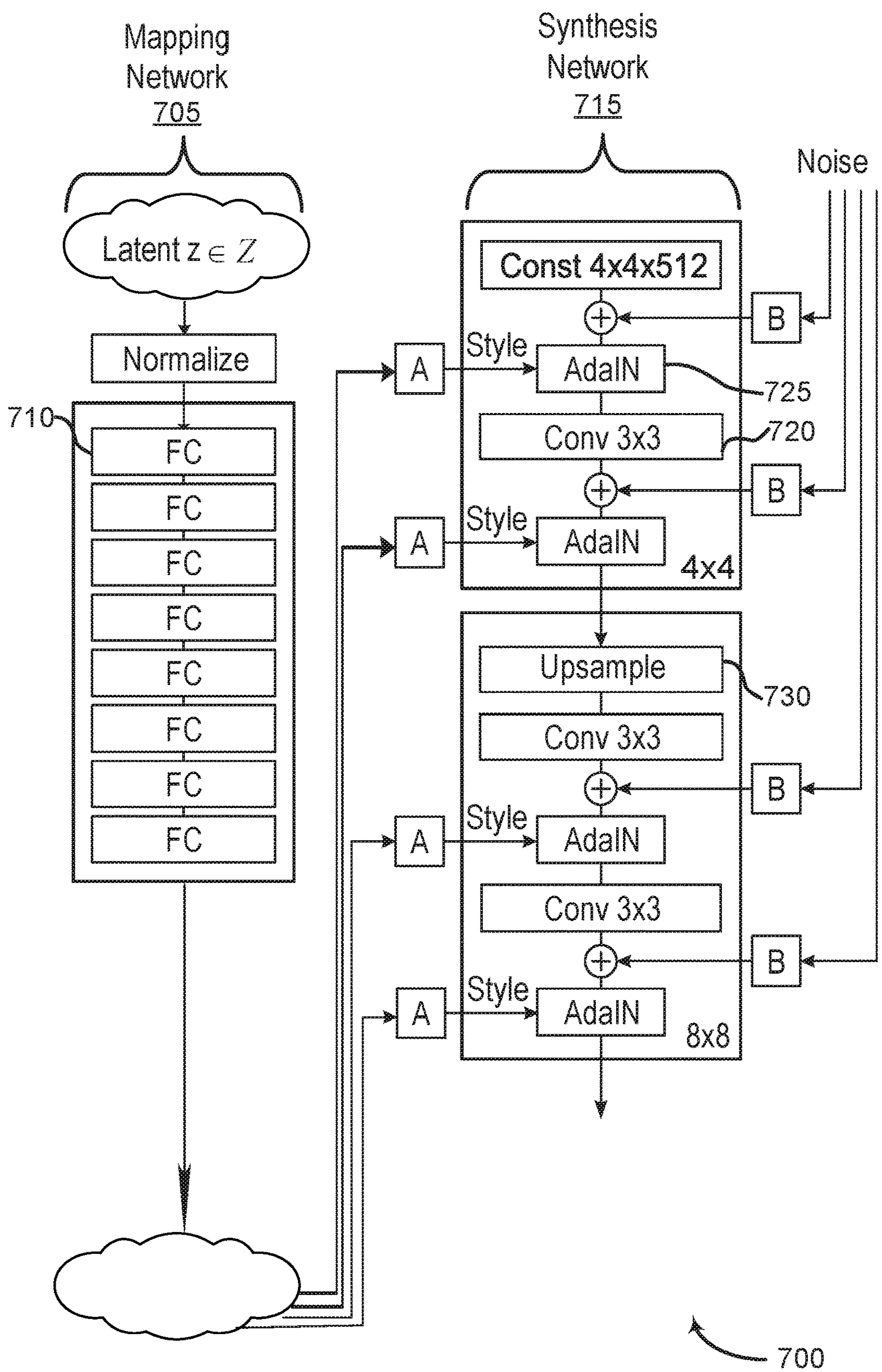
FIG. 7 shows an example of a generative adversarial network (GAN) according to aspects of the present disclosure.

FIG. 7 shows an example of a generative adversarial network (GAN) according to aspects of the present disclosure. The example shown includes GAN 700, mapping network 705, and synthesis network 715. In one aspect, mapping network 705 includes fully connected layer 710. In one aspect, synthesis network 715 includes convolutional layer 720, adaptive instance normalization layer 725, and upsampling layer 730.

Referring to FIG. 7, GAN is a group of artificial neural networks where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a generator network and a discriminator network. The generator network generates candidates while the discriminator network evaluates the candidates. The generator network learns to map from a latent space to a data distribution of interest, while the discriminator network distinguishes candidates produced by the generator from the true data distribution. The generator network's training objective is to increase the error rate of the discriminator network (e.g., to produce novel candidates that the discriminator network classifies as real).

The style generative adversarial networks (StyleGAN) is an extension to the GAN architecture that uses an alternative generator network including using a mapping network to map points in latent space to an intermediate latent space, using an intermediate latent space to control style at each point, and introducing noise as a source of variation at each point in the generator network.

In one aspect, the StyleGAN includes a mapping network 705 and a synthesis network 715. The mapping network 705 performs a reduced encoding of the original input and the synthesis network 715 generates, from the reduced encoding, a representation as close as possible to the original input. According to some embodiments, the mapping network 705 includes a deep learning neural network comprising one or more fully connected layers (e.g., fully connected layer 710). In some cases, the mapping network 705 takes a randomly sampled point from the latent space as input and generates a style vector as output.

According to some embodiments, the synthesis network 715 includes convolutional layer 720, adaptive instance normalization layer 725 (e.g., AdaIN layer), and upsampling layer 730. The synthesis network 715 takes a constant value (for example, a constant 4×4×512) as input in order to initiate the image synthesis process. The style vector generated from mapping network 705 is transformed and incorporated into each block of synthesis network 715 after the convolutional layer 720 via the AdaIN operation. The AdaIN layers first standardize the output of the feature map to a standard Gaussian, then add the style vector as a bias term. In some cases, the output of each convolutional layer 720 in the synthesis network 715 is a block of activation maps. In some cases, for example, the upsampling layer 730 doubles the dimensions of input (e.g., from 4×4 to 8×8) and is followed by a convolutional layer (e.g., convolutional layer 720).

According to some embodiments, Gaussian noise is added to each of these activation maps prior to the AdaIN operations. A different sample of noise is generated for each block and is interpreted using per-layer scaling factors. In some examples, the noise Gaussian introduces style-level variation at a given level of detail.

Figure 8:
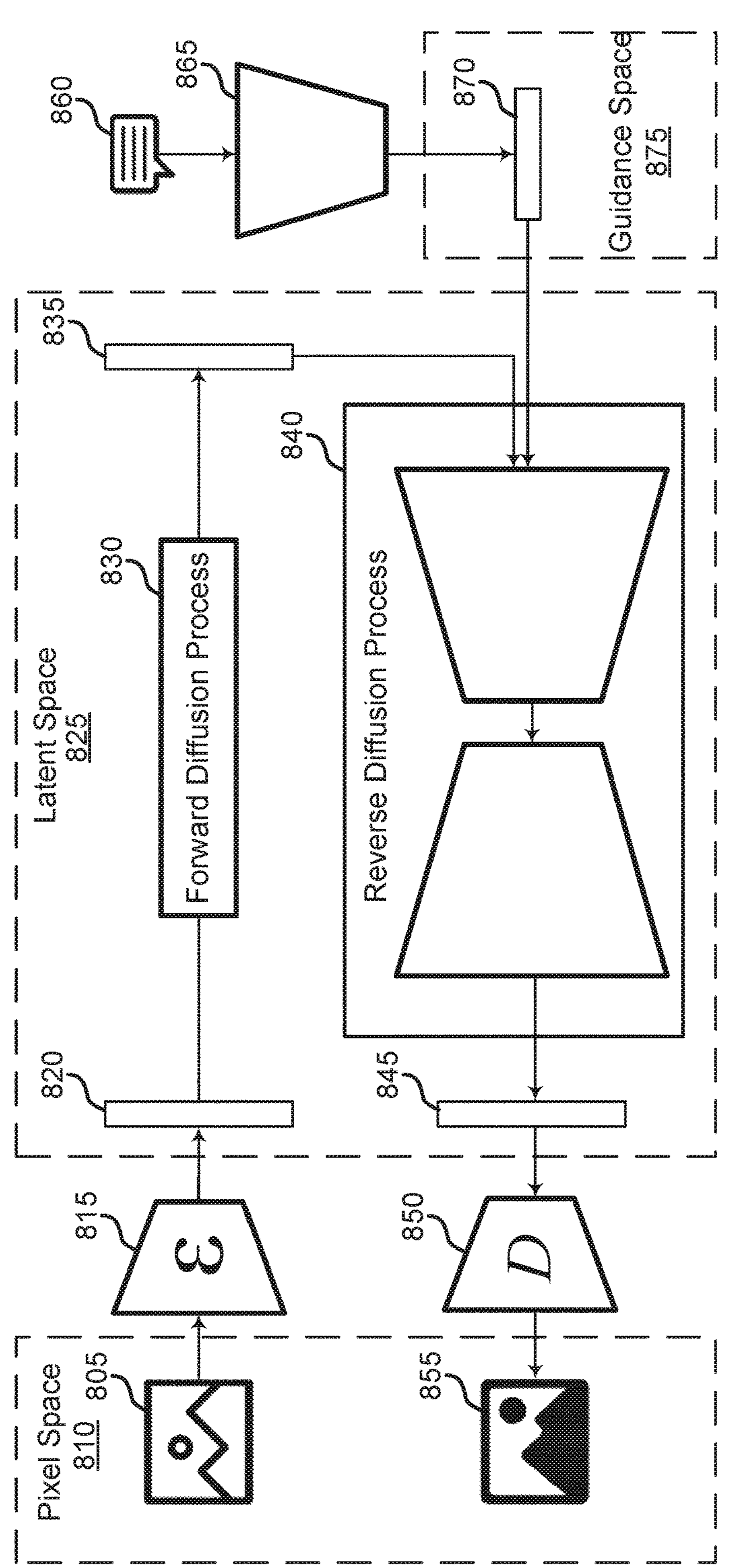
FIG. 8 shows an example of a diffusion model according to aspects of the present disclosure.

FIG. 8 shows an example of a diffusion model 800 according to aspects of the present disclosure. The example shown includes diffusion model 800, original image 805, pixel space 810, image encoder 815, original image feature 820, latent space 825, forward diffusion process 830, noisy feature 835, reverse diffusion process 840, denoised image feature 845, image decoder 850, output image 855, text prompt 860, text encoder 865, guidance feature 870, and guidance space 875.

Diffusion models are a class of generative neural networks that can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance, color guidance, style guidance, and image guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (e.g., latent diffusion).

Referring to FIG. 8, diffusion model 800 works by iteratively adding noise to the data during a forward process and then learning to recover the data by denoising the data during a reverse process. For example, during training, diffusion model 800 may take an original image 805 in a pixel space 810 as input and apply an image encoder 815 to convert original image 805 into original image features 820 in a latent space 825. Then, a forward diffusion process 830 gradually adds noise to the original image features 820 to obtain noisy features 835 (also in latent space 825) at various noise levels. In some cases, original image 805 is an example of, or includes aspects of, the input image described with reference to FIGS. 3 and 6.

Next, a reverse diffusion process 840 (e.g., a U-Net ANN) gradually removes the noise from the noisy features 835 at the various noise levels to obtain the denoised image features 845 in latent space 825. In some examples, denoised image features 845 are compared to the original image features 820 at each of the various noise levels, and parameters of the reverse diffusion process 840 of the diffusion model are updated based on the comparison. Finally, an image decoder 850 decodes the denoised image features 845 to obtain an output image 855 in pixel space 810. In some cases, an output image 855 is created at each of the various noise levels. The output image 855 can be compared to the original image 805 to train the reverse diffusion process 840. In some cases, output image 855 refers to the preliminary image (e.g., described with reference to FIG. 6).

In some cases, image encoder 815 and image decoder 850 are pre-trained prior to training the reverse diffusion process 840. In some examples, image encoder 815 and image decoder 850 are trained jointly, or the image encoder 815 and image decoder 850 are fine-tuned jointly with the reverse diffusion process 840.

The reverse diffusion process 840 can also be guided based on a text prompt 860, or another guidance prompt, such as an image, a layout, a style, a color, a segmentation map, etc. The text prompt 860 can be encoded using a text encoder 865 (e.g., a multimodal encoder) to obtain guidance features 870 in guidance space 875. The guidance features 870 can be combined with the noisy features 835 at one or more layers of the reverse diffusion process 840 to ensure that the output image 855 includes content described by the text prompt 860. For example, guidance feature 870 can be combined with the noisy feature 835 using a cross-attention block within the reverse diffusion process 840. In some cases, text prompt 860 refers to the corresponding element described with reference to FIGS. 3 and 6.

In some examples, diffusion models are based on a neural network architecture known as a U-Net. The U-Net takes input features having an initial resolution and an initial number of channels, and processes the input features using an initial neural network layer (e.g., a convolutional network layer) to generate intermediate features. The intermediate features are then down-sampled using a down-sampling layer such that down-sampled features have a resolution less than the initial resolution and a number of channels greater than the initial number of channels.

This process is repeated multiple times, and then the process is reversed. For example, the down-sampled features are up-sampled using the up-sampling process to obtain up-sampled features. The up-sampled features can be combined with intermediate features having the same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features may include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt (e.g., text prompt 860) describing content to be included in a generated image. For example, a user may provide the prompt "A plumber person". In some examples, guidance can be provided in a form other than text, such as via an image, a sketch, a color, a style, or a layout. The system converts text prompt 860 (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A transformer, transformer model, or transformer network is a type of neural network model used for natural language processing tasks. A transformer network transforms one sequence into another sequence using an encoder and a decoder. The encoder and decoder include modules that can be stacked on top of each other multiple times. The modules comprise multi-head attention and feed-forward layers. The inputs and outputs (target sentences) are first embedded into an n-dimensional space. Positional encoding of the different words (e.g., give every word/part in a sequence a relative position since the sequence depends on the order of its elements) is added to the embedded representation (n-dimensional vector) of each word. In some examples, a transformer network includes an attention mechanism, where the attention looks at an input sequence and decides at each step which other parts of the sequence are important. The attention mechanism involves a query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence as Q. However, for the attention module that takes into account the encoder and the decoder sequences, V is different from the sequence represented by Q. In some cases, values in V are multiplied and summed with some attention-weights a.

In the machine learning field, an attention mechanism is a method of placing differing levels of importance on different elements of an input. Calculating attention may involve three basic steps. First, a similarity between the query and key vectors obtained from the input is computed to generate attention weights. Similarity functions used for this process can include the dot product, splice, detector, and the like. Next, a softmax function is used to normalize the attention weights. Finally, the attention weights are weighed together with the corresponding values. In the context of an attention network, the key and value are vectors or matrices that are used to represent the input data. The key is used to determine which parts of the input the attention mechanism should focus on, while the value is used to represent the actual data being processed.

The term "self-attention" refers to a machine learning model in which representations of the input interact with each other to determine attention weights for the input. Self-attention can be distinguished from other attention models because the attention weights are determined at least in part by the input itself.

A noise map is initialized that includes random noise. The noise map may be in a pixel space or a latent space. By initializing an image with random noise, different variations of an image including the content described by the conditional guidance can be generated. Then, the diffusion model 800 generates an image based on the noise map and the conditional guidance vector.

A diffusion process can include both a forward diffusion process 830 for adding noise to an image (e.g., original image 805) or features (e.g., original image feature 820) in a latent space 825 and a reverse diffusion process 840 for denoising the images (or features) to obtain a denoised image (e.g., output image 855). The forward diffusion process 830 can be represented as $q(x_t|x_{t-1})$, and the reverse diffusion process 840 can be represented as $p(x_{t-1}|x_t)$. In some cases, the forward diffusion process 830 is used during training to generate images with successively greater noise, and a neural network is trained to perform the reverse diffusion process 840 (e.g., to successively remove the noise).

In an example forward diffusion process 830 for a latent diffusion model (e.g., diffusion model 800), the diffusion model 800 maps an observed variable $x_0$ (either in a pixel space 810 or a latent space 825) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse diffusion process 840. During the reverse diffusion process 840, the diffusion model 800 begins with noisy data $x_T$, such as a noisy image and denoises the data to obtain the $p(x_{t-1}|x_t)$. At each step t−1, the reverse diffusion process 840 takes $x_t$, such as the first intermediate image, and t as input. Here, t represents a step in the sequence of transitions associated with different noise levels, The reverse diffusion process 840 outputs $x_{t-1}$, such as the second intermediate image iteratively until $x_T$ is reverted back to $x_0$, the original image 805. The reverse diffusion process 840 can be represented as:

$$p_\theta(x_{t-1} \mid x_t) := N\left(x_{t-1}; \mu_\theta(x_t, t), \sum\nolimits_\theta(x_t, t)\right). \tag{1}$$

The joint probability of a sequence of samples in the Markov chain can be written as a product of conditionals and the marginal probability:

$$x_T: \; p_\theta(x_{0:T}) := p(x_T)\prod\nolimits_{t=1}^{T} p_\theta(x_{t-1} \mid x_t), \tag{2}$$

where $p(x_T)=N(x_T;0,I)$ is the pure noise distribution as the reverse diffusion process 840 takes the outcome of the forward diffusion process 830, a sample of pure noise, as input and $$\prod\nolimits_{t=1}^{T} p_\theta(x_{t-1}|x_t)$$

represents a sequence of Gaussian transitions corresponding to a sequence of addition of Gaussian noise to the sample.

At interference time, observed data $x_0$ in a pixel space can be mapped into a latent space 825 as input and a generated data $\tilde{x}$ is mapped back into the pixel space 810 from the latent space 825 as output. In some examples, $x_0$ represents an original input image with low image quality, latent variables $x_1, \ldots, x_T$ represent noisy images, and $\tilde{x}$ represents the generated image with high image quality.

Diffusion model 800 may be trained using both a forward diffusion process 830 and reverse diffusion process 840. In one example, the user initializes an untrained model. Initialization can include defining the architecture of the model and establishing initial values for the model parameters. In some cases, the initialization can include defining hyper-parameters such as the number of layers, the resolution and channels of each layer block, the location of skip connections, and the like.

The system then adds noise to a training image using forward diffusion process 830 in N stages. In some cases, the forward diffusion process 830 is a fixed process where Gaussian noise is successively added to an image. In latent diffusion models, the Gaussian noise may be successively added to features (e.g., original image features 820) in a latent space 825.

At each stage n, starting with stage N, reverse diffusion process 840 is used to predict the image or image features at stage n−1. For example, the reverse diffusion process 840 can predict the noise that was added by the forward diffusion process 830, and the predicted noise can be removed from the image to obtain the predicted image. In some cases, an original image is predicted at each stage of the training process.

The training component compares predicted image (or image features) at stage n−1 to an actual image (or image features), such as the image at stage n−1 or the original input image. For example, given observed data x, the diffusion model 800 may be trained to minimize the variational upper bound of the negative log-likelihood $-\log p_\theta(x)$ of the training data. The training system then updates parameters of the diffusion model 800 based on the comparison. For example, parameters of a U-Net may be updated using gradient descent. Time-dependent parameters of the Gaussian transitions can also be learned.

Image encoder 815 is an example of, or includes aspects of, the corresponding element described with reference to FIGS. 5 and 6. Text prompt 860 is an example of, or includes aspects of, the corresponding element described with reference to FIGS. 3 and 6. Text encoder 865 is an example of, or includes aspects of, the corresponding element described with reference to FIG. 5.

Image Editing

In FIG. 9, a method, apparatus, non-transitory computer readable medium, and system for image processing are described. One or more aspects of the method, apparatus, non-transitory computer readable medium, and system include generating, using an image encoder of a machine learning model, a preliminary latent code based on a text prompt and an input image depicting a person. The one or more aspects further include generating, using an image generator of the machine learning model, a preliminary image based on the preliminary latent code. The one or more aspects further include computing an identity preserving loss based on the input image and the preliminary image. The one or more aspects further include optimizing the preliminary latent code based on the identity preserving loss to obtain an optimized latent code. In one aspect, the optimized latent code preserves an identity of the person in the input image. The one or more aspects further include generating, using the image generator of the machine learning model, a synthetic image based on the optimized latent code.

Some examples of the method, apparatus, non-transitory computer readable medium, and system further include iteratively generating preliminary images and computing the identity preserving loss to update the optimized latent code. Some examples of the method, apparatus, non-transitory computer readable medium, and system further include computing a multi-modal loss based on the preliminary image and the text prompt. In some cases, the optimized latent code is optimized based on the multi-modal loss. Some examples of the method, apparatus, non-transitory computer readable medium, and system further include computing a perceptual loss based on the preliminary image and the input image. In some cases, the optimized latent code is optimized based on the perceptual loss.

Some examples of the method, apparatus, non-transitory computer readable medium, and system further include encoding, using a text encoder, the text prompt to obtain a text encoding. In some cases, the optimized latent code is generated based on the text encoding. Some examples of the method, apparatus, non-transitory computer readable medium, and system further include encoding, using the image encoder of the machine learning model, the input image to obtain an image encoding. In some cases, the optimized latent code is generated based on the image encoding FIG. 9 shows an example of a method 900 for computing identity preserving loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system generates, using an image encoder of the machine learning model, a preliminary latent code based on the input image and the text prompt. In some cases, the operations of this step refer to, or may be performed by, an image encoder as described with reference to FIGS. 5, 6, and 8. For example, the image generation model (e.g., image generation model described with reference to FIG. 6) includes an image encoder and a text encoder. In some cases, the input image depicts a person and the text prompt describes a profession. The image encoder encodes the input image to generate an image embedding. The text encoder encodes the text prompt to generate a text embedding. In one aspect, the preliminary latent code includes the image embedding and the text embedding (e.g., in latent space).

At operation 910, the system generates, using the image generator of the machine learning model, a preliminary image based on the preliminary latent code. In some cases, the operations of this step refer to, or may be performed by, an image generator as described with reference to FIG. 5. For example, the image generator uses the preliminary latent code (including the image embedding and the text embedding) to generate a preliminary image. In some cases, the preliminary image includes a biased depiction of the person from the input image. For example, the person depicted in the preliminary image may have a different skin tone or a feature that represents a different gender or ethnicity than the person depicted in the input image. In some cases, the biased depiction is a result of the inherent semantics of the text embedding.

At operation 915, the system computes the identity preserving loss based on the input image and the preliminary image. In some cases, the operations of this step refer to, or may be performed by, an optimization component as described with reference to FIGS. 5 and 6. For example, the machine learning model extracts input image identity from input image and preliminary image identity from the preliminary image. For example, input image identity and preliminary image identity are represented in the form of a vector. For example, a pretrained ArcFace network is used to compute the input image identity and preliminary image identity.

According to some embodiments, a gradient-based latent code optimization is performed to optimize an image generation model to preserve the identity of the person from the input image in the output synthetic image. For example, the biased latent code (e.g., the preliminary latent code) is optimized using one or more losses. In some cases, the expected image editing based on the text prompt is also maintained. According to some embodiments, the identity of the person in the input image is preserved by minimizing the following losses:

$$\mathcal{L}_{ID} = 1 - CosineSim(R(i_o), R(i_g)), \tag{3}$$

where $\mathcal{L}_{ID}$ represents the identity preserving loss, CosineSim(•) computes the cosine similarity between two vectors, R(•) is the pretrained ArcFace network, $i_o$ is the input image, and $i_g$ is the preliminary image. Additionally or alternatively, the preliminary latent code is optimized using a perceptual loss $\mathcal{L}_{LPIPS}$:

$$\mathcal{L}_{LPIPS} = \|F(i_o) - F(i_g)\|_2, \tag{4}$$

where F(•) represents a perceptual feature extractor.

ArcFace network is a face recognition algorithm that uses an angular margin loss function to learn the proximity between image embeddings of images depicting faces. For example, the ArcFace network combines the angular margin loss to a softmax loss. The ArcFace network is able to map faces from the same identity close together in a high-dimensional feature space while embeddings from different identities are spaced apart.

A perceptual feature extractor is a type of neural network that captures and extracts meaningful features from input data that includes images. The perceptual feature extractor is trained to extract basic patterns like edges and textures in the lower convolutional layers and progressively extract more complex and abstract features in higher convolutional layers, which is similar to the way that humans visually perceive and interpret. In some cases, the perceptual feature extractor is used to recognize patterns in images, detect objects, or perform segmentations.

According to some embodiments, the preliminary latent code is optimized using a multi-modal loss. By applying the multi-modal loss, both the identity of the person and additional image editing based on the text prompt are preserved. For example, the multi-modal loss may be represented as CLIP loss $\mathcal{L}_{CLIP}$:

$$\mathcal{L}_{CLIP} = 1 - \text{CLIP}(t, i_g), \tag{5}$$

where CLIP(•) computes cosine similarity between two embeddings, and t is the text prompt. For example, the CLIP score is calculated based on a text embedding of the text prompt and the image embedding of the preliminary image.

According to an embodiment, the machine learning model of the present disclosure optimizes the preliminary latent code using one or more losses to obtain the latent code. In one embodiment, the preliminary latent code is optimized (either directly or indirectly) to control the output of the image generation model via back-propagation using the following loss:

$$\mathcal{L} = \beta_1 * \mathcal{L}_{CLIP} + \beta_2 * \mathcal{L}_{ID} + \beta_3 * \mathcal{L}_{LPIPS}, \tag{6}$$

where $\beta_1$, $\beta_2$, and $\beta_3$ are hyperparameters that control each loss function. In one embodiment, the preliminary latent code is optimized using the multi-modal loss and the identity preserving loss. In one embodiment, the preliminary latent code is optimized using the multi-modal loss and the perceptual loss. In one embodiment, the preliminary latent code is optimized using the perceptual loss and the identity preserving loss.

FIG. 10 shows an example of a computing device 1000 according to aspects of the present disclosure. The example shown includes computing device 1000, processor(s), memory subsystem 1010, communication interface 1015, I/O interface 1020, user interface component(s), and channel 1030.

In some embodiments, computing device 1000 is an example of, or includes aspects of, the image processing apparatus described with reference to FIGS. 1, and 5. In some embodiments, computing device 1000 includes one or more processors 1005 that can execute instructions stored in memory subsystem 1010 to obtain a text prompt and an input image depicting a person. The instructions further include generating a latent code based on the text prompt and the input image, where the latent code is optimized by an identity preserving loss. The instructions further include generating, using an image generator of a machine learning model, a synthetic image based on the latent code, where the synthetic image includes an element of the text prompt and preserves an identity of the person in the input image.

According to some embodiments, computing device 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing. Processor(s) 1005 is an example of, or includes aspects of, the processor unit described with reference to FIG. 5.

According to some embodiments, memory subsystem 1010 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1010 is an example of, or includes aspects of, the memory unit described with reference to FIG. 5.

According to some embodiments, communication interface 1015 operates at a boundary between communicating entities (such as computing device 1000, one or more user devices, a cloud, and one or more databases) and channel 1030 and can record and process communications. In some cases, communication interface 1015 is provided to enable a processing system coupled to a transceiver (e.g., a transmitter and/or a receiver). In some examples, the transceiver is configured to transmit (or send) and receive signals for a communications device via an antenna. In some cases, a bus is used in communication interface 1515.

According to some embodiments, I/O interface 1020 is controlled by an I/O controller to manage input and output signals for computing device 1000. In some cases, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or hardware components controlled by the I/O controller.

According to some embodiments, user interface component(s) 1025 enables a user to interact with computing device 1000. In some cases, user interface component(s) 1025 include an audio device, such as an external speaker system, an external display device such as a display screen, an input device (e.g., a remote-control device interfaced with a user interface directly or through the I/O controller), or a combination thereof.

The performance of apparatus, systems, and methods of the present disclosure have been evaluated, and results indicate embodiments of the present disclosure have obtained increased performance (such as accurate image generation) over existing technology (e.g., image generation models). Example experiments demonstrate that the image processing apparatus based on the present disclosure outperforms conventional image generation models. Details on the example use cases based on embodiments of the present disclosure are described with reference to FIG. 3.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a text prompt and an input image, wherein the text prompt describes an element, and wherein the input image depicts a person having an input image identity;

generating a latent code based on the text prompt and the input image by generating a preliminary latent code based on the text prompt and the input image and performing an optimization process on the preliminary latent code, wherein the preliminary latent code represents a preliminary image identity different from the input image identity, and wherein the optimization process includes iteratively computing an identity preserving loss and applying the identity preserving loss to the preliminary latent code; and generating, using an image generator of a machine learning model, a synthetic image based on the latent code, wherein the synthetic image includes the element of the text prompt and preserves the input image identity of the person in the input image.

2. The method of claim 1, wherein generating the latent code comprises:

generating, using an image encoder of the machine learning model, the preliminary latent code based on the input image and the text prompt;

generating, using the image generator of the machine learning model, a preliminary image based on the preliminary latent code; and computing the identity preserving loss based on the input image and the preliminary image.

3. The method of claim 2, further comprising:

iteratively generating preliminary images and computing the identity preserving loss to optimize the latent code.

4. The method of claim 2, further comprising:

computing a multi-modal loss based on the preliminary image and the text prompt, wherein the latent code is optimized based on the multi-modal loss.

5. The method of claim 2, further comprising:

computing a perceptual loss based on the preliminary image and the input image, wherein the latent code is optimized based on the perceptual loss.

6. The method of claim 2, further comprising:

identifying a biased depiction of the person by calculating an attribute prediction score based on the input image and the preliminary image.

7. The method of claim 1, wherein generating the latent code comprises:

encoding, using a text encoder, the text prompt to obtain a text encoding, wherein the latent code is generated based on the text encoding.

8. The method of claim 1, further comprising:

encoding, using an image encoder of the machine learning model, the input image to obtain an image encoding, wherein the latent code is generated based on the image encoding.

9. The method of claim 1, wherein:

the identity preserving loss is based on the input image and a preliminary image generated by the machine learning model.

10. An apparatus comprising:

at least one processor;

at least one memory storing instructions executable by the at least one processor; and a machine learning model comprising parameters stored in the at least one memory and trained to generate a synthetic image, wherein the machine learning model comprises an image encoder configured to generate a latent code based on a text prompt describing an element and an input image depicting a person having an input image identity by generating a preliminary latent code based on the text prompt and the input image and performing an optimization process on the preliminary latent code, wherein the preliminary latent code represents a preliminary image identity different from the input image identity, an optimization component configured to optimize the latent code by iteratively computing an identity preserving loss and applying the identity preserving loss to the preliminary latent code, and an image generator configured to generate the synthetic image including the element of the text prompt and preserving the input image identity of the person in the input image.

11. The apparatus of claim 10, wherein:

the machine learning model comprises a text encoder configured to encode the text prompt.

12. The apparatus of claim 10, wherein:

the machine learning model comprises a generative adversarial network (GAN).

13. The apparatus of claim 10, wherein:

the machine learning model comprises a variational autoencoder (VAE).

14. The apparatus of claim 10, wherein:

the machine learning model comprises a diffusion model.

15. A non-transitory computer readable medium storing code for image processing, the code comprising instructions executable by at least one processor to:

generate, using an image generator of a machine learning model, a preliminary image based on a preliminary latent code, wherein the preliminary latent code is based on an input image depicting a person having an input image identity, and wherein the preliminary latent code represents a preliminary image identity different from the input image identity;

optimize the preliminary latent code generated based on a text prompt describing an element and the input image by iteratively computing an identity preserving loss and applying the identity preserving loss to the preliminary latent code to obtain an optimized latent code, wherein the optimized latent code preserves an identity of the person in the input image; and generate, using the image generator of the machine learning model, a synthetic image based on the optimized latent code, wherein the synthetic image includes the element of the text prompt and preserves the input image identity of the person in the input image.

16. The non-transitory computer readable medium of claim 15, the code further comprising instructions executable by the at least one processor to:

iteratively generate preliminary images and computing the identity preserving loss to update the optimized latent code.

17. The non-transitory computer readable medium of claim 15, the code further comprising instructions executable by the at least one processor to:

compute a multi-modal loss based on the preliminary image and the text prompt, wherein the optimized latent code is optimized based on the multi-modal loss.

18. The non-transitory computer readable medium of claim 15, the code further comprising instructions executable by the at least one processor to:

compute a perceptual loss based on the preliminary image and the input image, wherein the optimized latent code is optimized based on the perceptual loss.

19. The non-transitory computer readable medium of claim 15, the code further comprising instructions executable by the at least one processor to:

encode, using a text encoder, the text prompt to obtain a text encoding, wherein the optimized latent code is generated based on the text encoding.

20. The non-transitory computer readable medium of claim 15, wherein:

the preliminary latent code is generated by an image encoder based on the text prompt and the input image.

* * * * *